United States Patent
Sargeant et al.

(12) 
(10) Patent No.: US 6,593,406 B2
(45) Date of Patent: Jul. 15, 2003

(54) POLYESTER OVERLAMINATION FILM WITH ENHANCED UV STABILIZATION PROPERTIES

(75) Inventors: Steven J. Sargeant, East Greenwich, RI (US); Yijun Ye, North Kingstown, RI (US)

(73) Assignee: Toray Plastics (America), Inc., RI (US)

( * ) Notice: Subject to any disclaimer, the term of this patent is extended or adjusted under 35 U.S.C. 154(b) by 131 days.

(21) Appl. No.: 09/733,439

(22) Filed: Dec. 8, 2000

(65) Prior Publication Data

US 2002/0103279 A1 Aug. 1, 2002

(51) Int. Cl.$^7$ ................................................ C08K 5/16
(52) U.S. Cl. ...................................................... 524/186
(58) Field of Search ........................................ 524/186

(56) References Cited

U.S. PATENT DOCUMENTS

| | | | |
|---|---|---|---|
| 4,265,804 A | 5/1981 | Zannucci et al. | |
| 4,378,392 A | 3/1983 | Segel | |
| 4,431,762 A | 2/1984 | Araki et al. | |
| 4,446,262 A | 5/1984 | Okumura et al. | |
| 4,507,447 A | * 3/1985 | Yamazaki | ................... 525/528 |
| 5,558,912 A | 9/1996 | Fagerburg et al. | |
| 5,709,929 A | 1/1998 | Venema | |
| 6,063,858 A | * 5/2000 | Daniels | ....................... 524/563 |

FOREIGN PATENT DOCUMENTS

| | | |
|---|---|---|
| EP | 0 715 965 | 6/1996 |
| WO | WO 00/61664 | 10/2000 |

OTHER PUBLICATIONS

Fisher, R.M.; Ketola, W. "Exposure Test Results for Injet Inks in Interior Light Environments" in *Durability* 2000, ASTM–STP 1385.

Bucholz, B. "New Performance Standards Sets Durability Guidelines For Industry" in *The Big Picture Conference*, 2000, pp. 72–73.

Niemoller, A.; Becker, A. "Interactions of ink jet inks with ink jet coatings" *IS&T's NIP 13*, 1997 International Conference on Digital Printing Technologies, pp. 430–436.

* cited by examiner

Primary Examiner—Edward J. Cain
(74) Attorney, Agent, or Firm—Schnader Harrison Segal & Lewis LLP

(57) ABSTRACT

A UVA stabilized polyethylene terephthalate overlamination film having a maximum peak absorption of about 380 nm, an approximate absorptive area % of <14% and a Visible Absorbance value of less than about 20%, coated with an adhesive layer to facilitate anchorage of the polyethylene terephthalate film to a secondary print substrate.

11 Claims, 10 Drawing Sheets

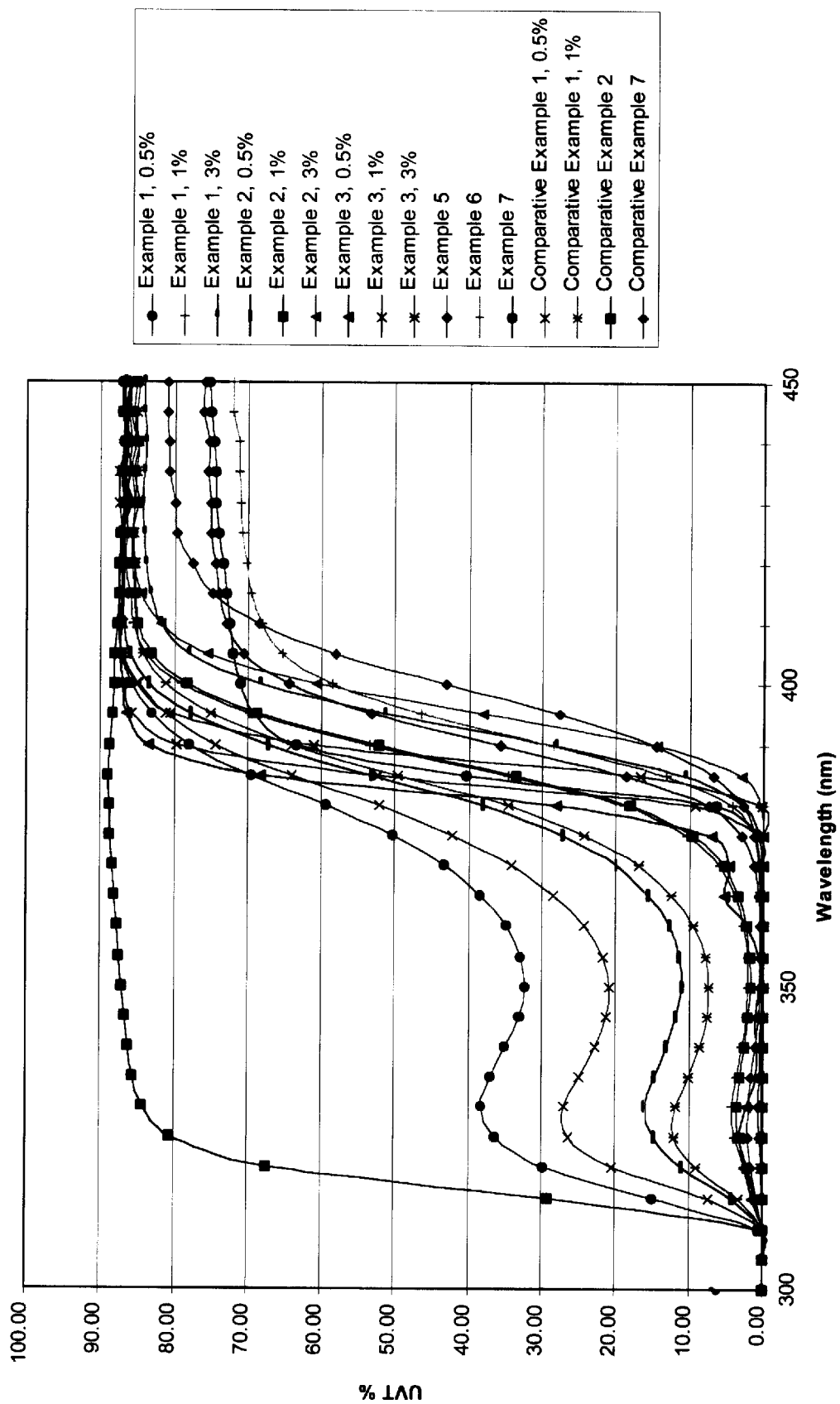
Figure 1: UVT of Cast PET Films with UV Stabilizers Compared with Existing UV Films

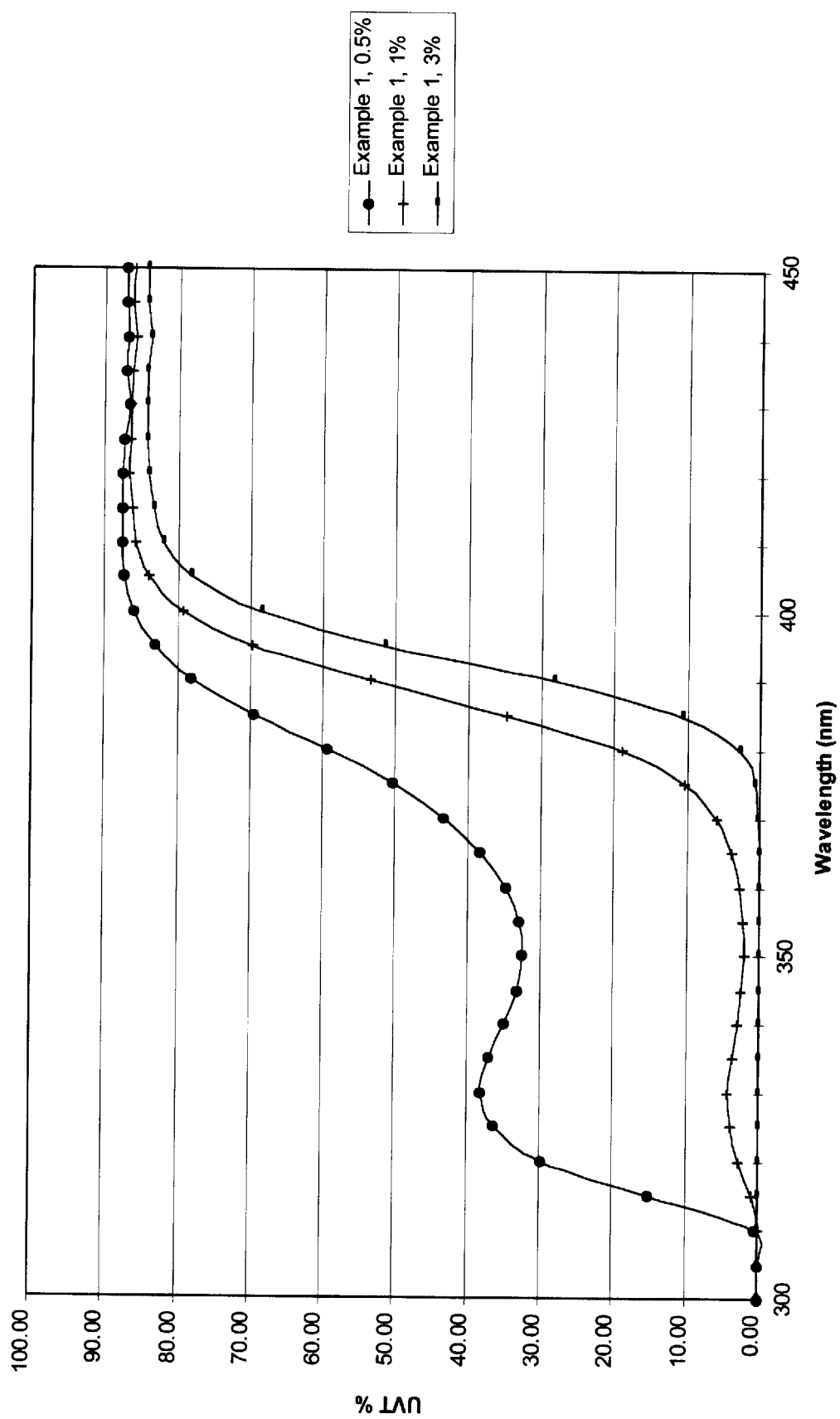
Figure 1A: UVT of Cast PET Films with UV Stabilizers Compared with Existing UV Films

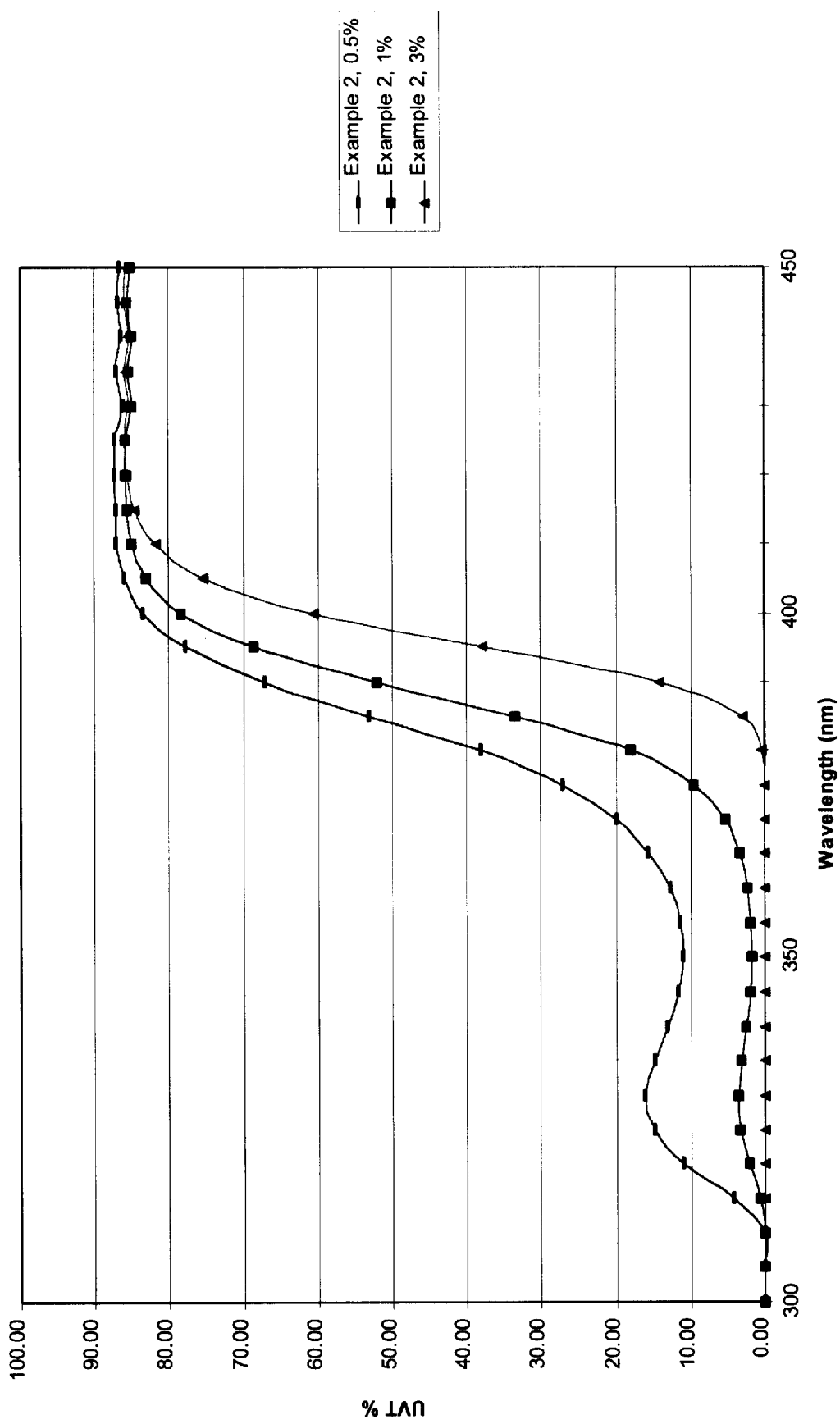
Figure 1B: UVT of Cast PET Films with UV Stabilizers Compared with Existing UV Films

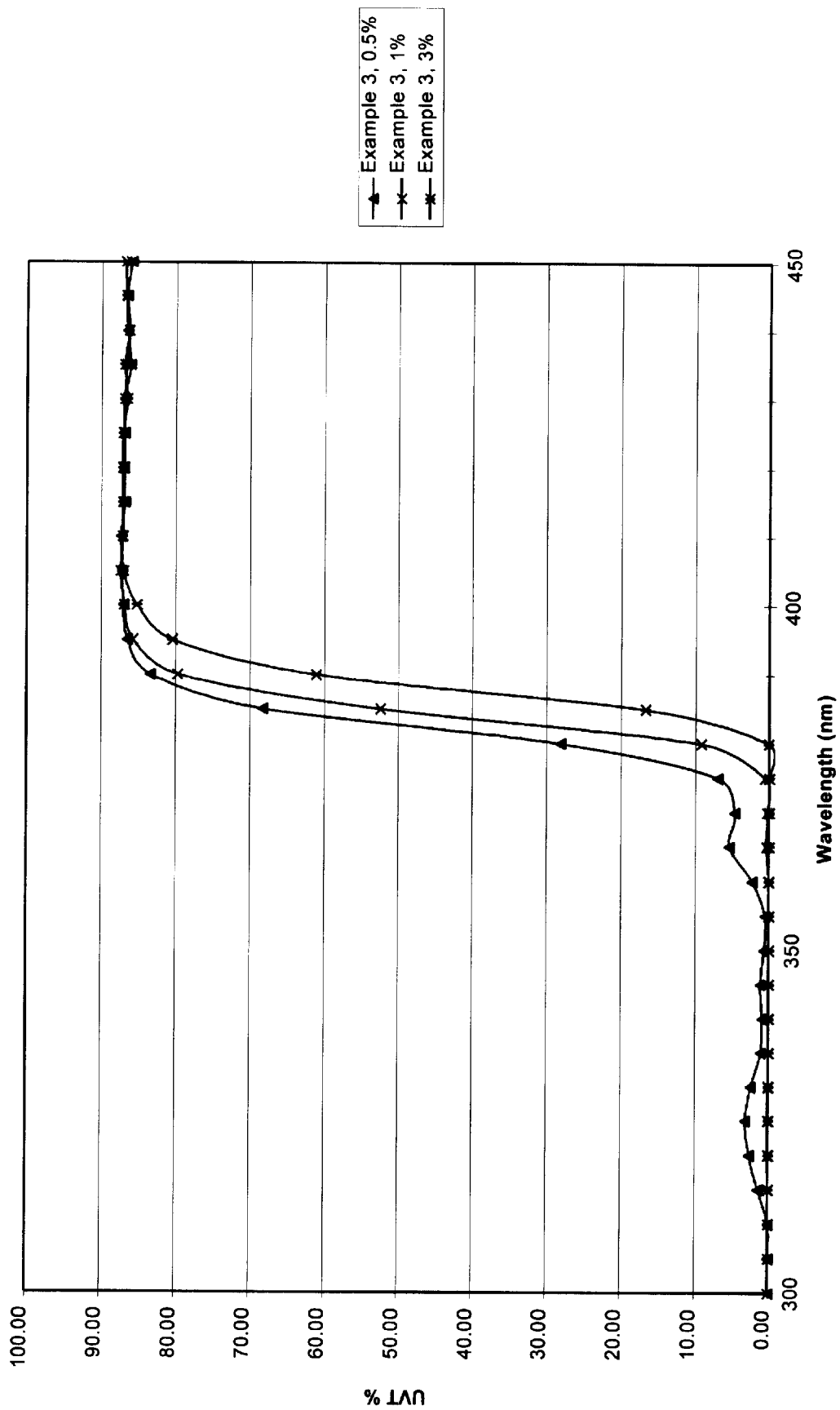

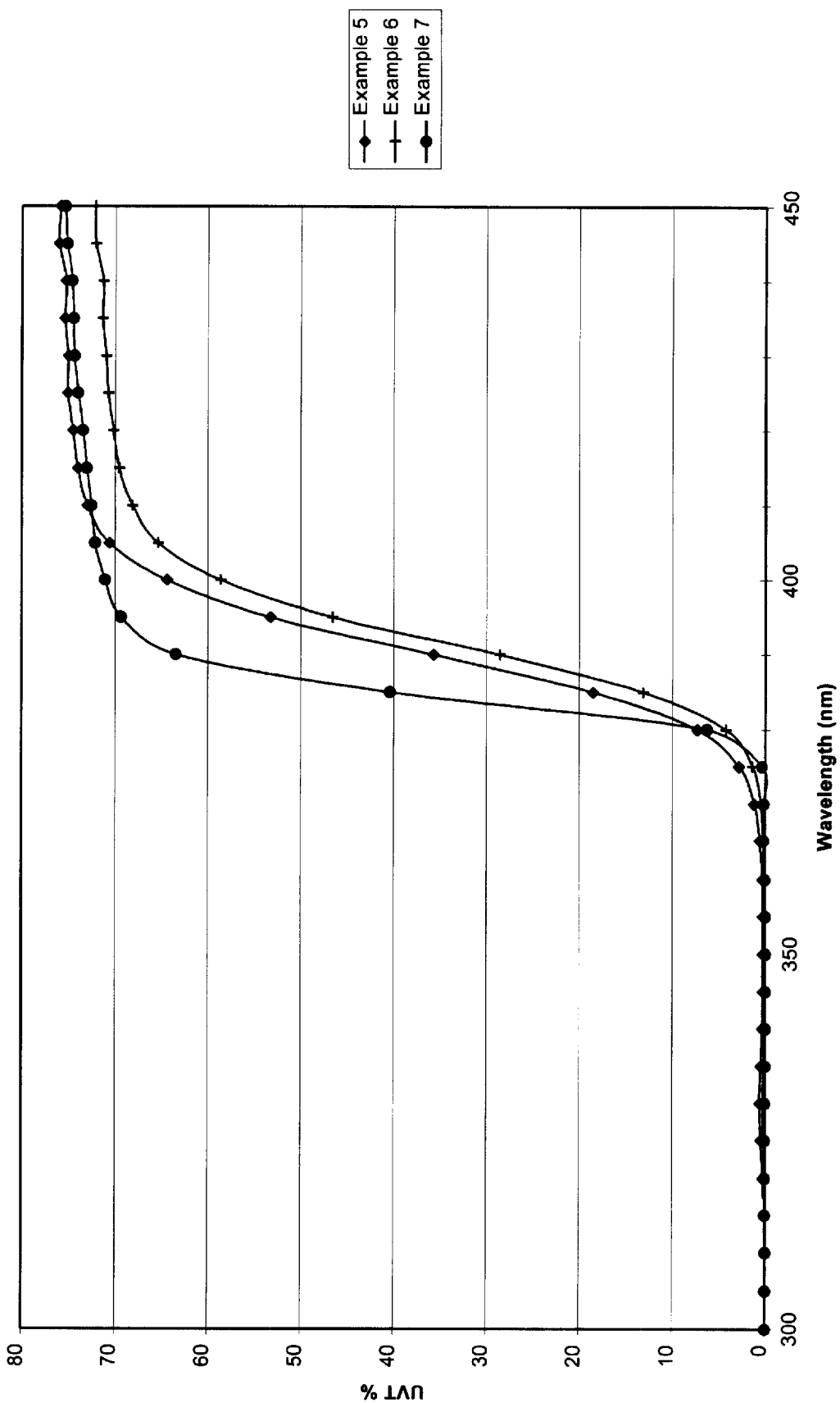
Figure 1D: UVT of Cast PET Films with UV Stabilizers Compared with Existing UV Films

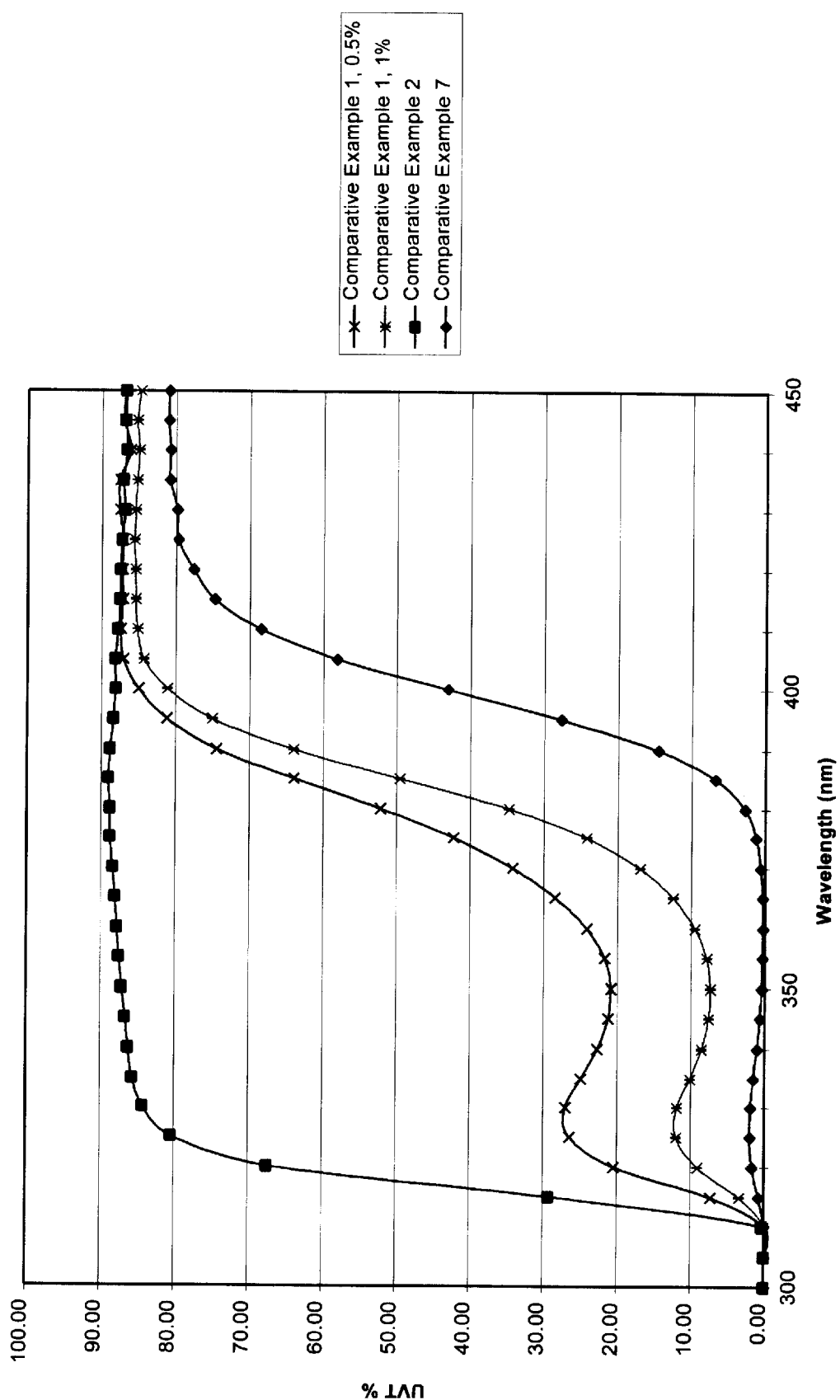

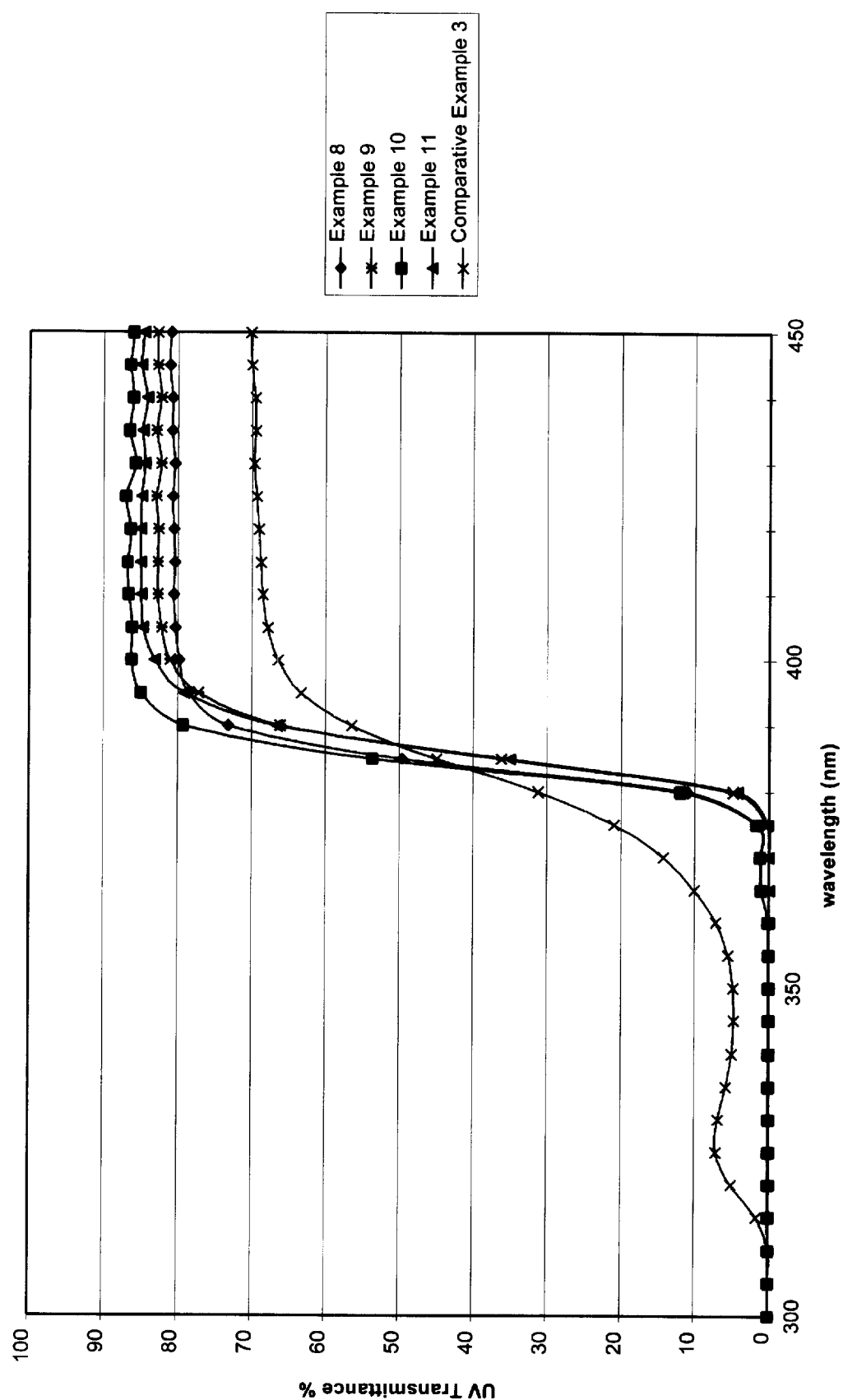

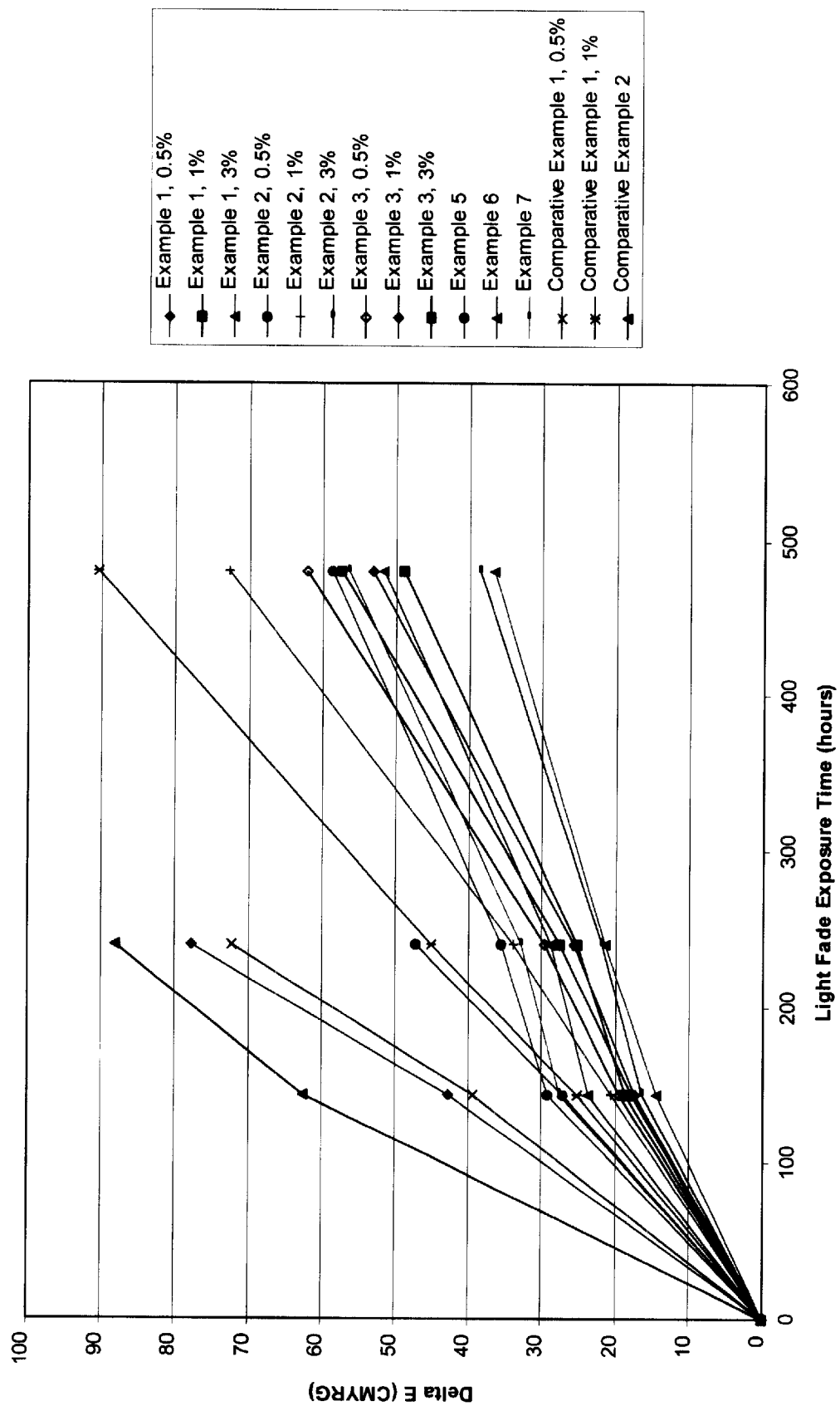

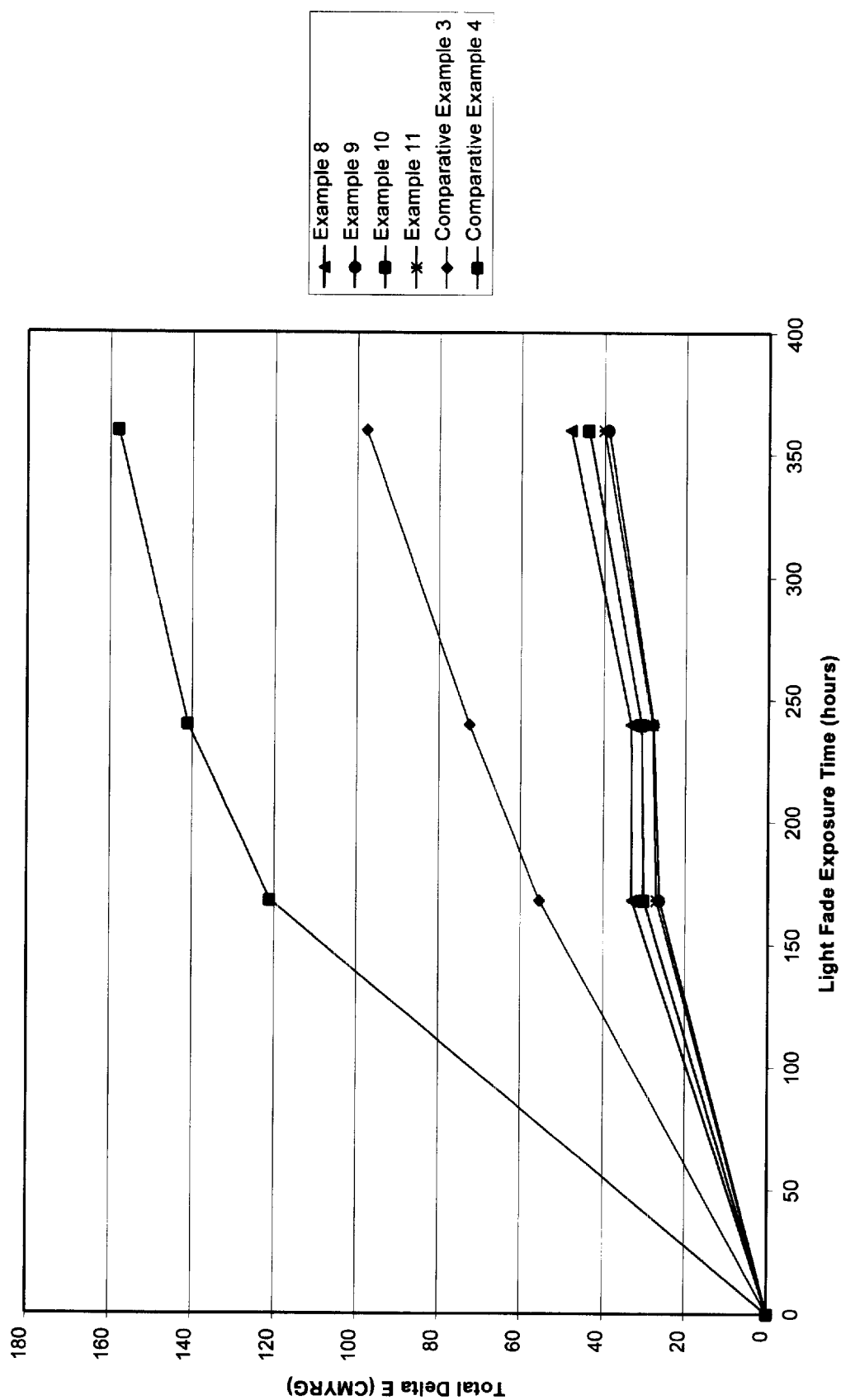

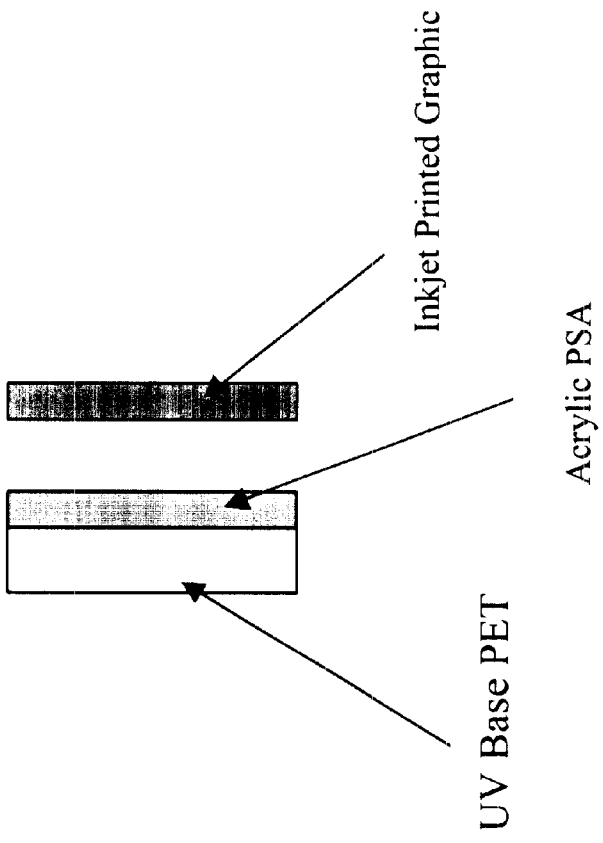
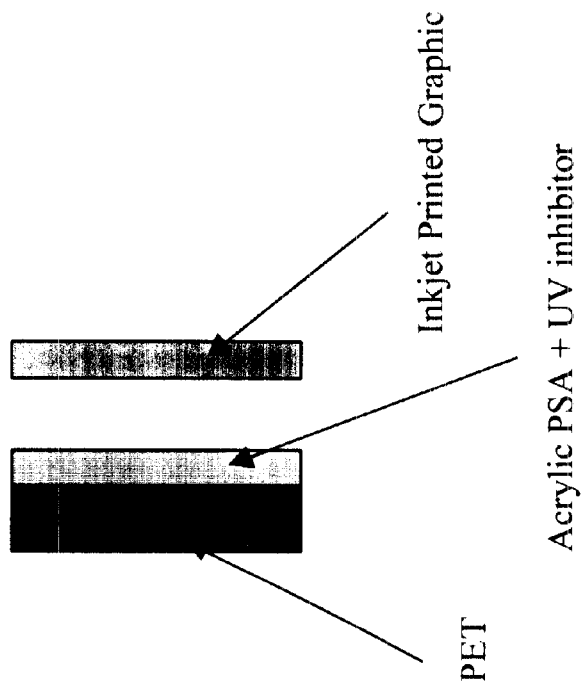
Diagram 1; Description of new overlamination base technology utilizing UVA stabilized PET for enhancement to the longevity of inkjet media.

POLYESTER OVERLAMINATION FILM WITH ENHANCED UV STABILIZATION PROPERTIES

BACKGROUND OF THE INVENTION

Printed graphics are susceptible to the degratory effects of UV light, rain, ozone, pollution and other external stimulus. In particular, the constant exposure of printed graphics to bright light sources is known to cause serious degradation to the color vibrancy and expected lifetime of the medium. It is well known in the art to overlaminate graphics to protect the images from such natural forces as shown in FIG. 1. Additionally, it is also described in the art that a preferred overlamination medium be constructed of a polyester film overcoated with an adhesive with UV stabilizers imbibed in the adhesive layer. However, the art has failed to provide significantly enhanced stability for the overlamination of graphics output when compared to unstabilized polyethylene terephthalate (PET).

DESCRIPTION OF PRIOR ART

U.S. Pat. No. 5,709,929 describes the construction of a multilayer plastic sheet based upon a cyclohexanedimethanol substituted PET. One layer of the multilayer film is described as containing an UV stabilizer. However the reference fails to teach important requirements for blocking efficiency, film coloration and weatherability necessary for overlamination.

U.S. Pat. No. 5,558,912 describes the stabilization of a cyclohexanedimethanol substituted PET with an UV stabilizer. Again, the reference does not teach the requirements for blocking efficiency, film coloration and weatherability, which is necessary for overlamination.

U.S. Pat. No. 4,446,262 describes the formulation of UV stabilized polymers, but again does not teach the novel requirements for blocking efficiency, film coloration and weatherability, which is necessary for overlamination.

U.S. Pat. No. 4,378,392 describes a multilayer, encapsulating, overlamination film for the enhancement of the longevity of photographs. One embodiment of the overlamination structure describes an UV stabilized PET film. However, it does not teach the novel requirements for blocking efficiency, film coloration and weatherability.

U.S. Pat. No. 4,265,804 describes the formulation of polyester objects having improved weatherability properties, but does not teach the novel requirements for blocking efficiency, film coloration and weatherability, which is necessary for overlamination.

In IS&T NIP13 "Interactions of inkjet inks with inkjet coatings", pages 430–436, the authors describe the potential value of using UV stabilized overlamination films to improve the longevity of inkjet printed graphics. However, the authors don't teach the unanticipated value of UV stabilizing a PET film, instead of the adhesive components, to improve longevity of the graphic medium.

Other References

Fisher, R. M.; Ketola, W. "Exposure Test Results for Inkjet Inks in Interior Light Environments" in Durability 2000, ASTM-STP 1385.

Bucholz, B. "New Performance Standards Sets Durability Guidelines For Industry" in The Big Picture Conference, 2000, pages 72–73.

PCT WO 00/61664 Describes the formulation of multilayer films with enhanced UV stability properties.

Description of the Invention

Surprisingly, the inventors have discovered that overlamination films constructed of polyethylene terephthalate (PET), stabilized with specific, sharp boundary transition, UV stabilizers in the PET layer provide a significantly enhanced stability for the over lamination of graphics output when compared to unstabilized PET, or adhesive stabilized overlamination films. This technology is particularly suited for the stabilization of inkjet media output. Specific UV absorbent materials, UVAs, were admixed into PET chip having an intrinsic viscosity (IV) of 0.65. The resultant blend was extruded onto a casting drum to produce a PET sheet of about 1.0 mil thickness. The UVA properties of the polyester films were measured via the use of a Hitachi U-3210 UV/VIS spectrophotometer. UV transmission spectra were taken and the percentage of total transmittance was calculated from 300 nm to 400 nm. The percent transmittance from 300 nm to 400 nm was calculated as an area percent. Therefore, 0 area % would indicate complete cutoff in the range of 300 nm to 400 nm. The transmittance of the films in the visible region, that is greater than 400 nm, was also calculated as an area percentage. The related UV-Vis transmission spectra are plotted in FIGS. 1 and 2.

Test overlamination films were then prepared by hand-coating the PET sheets with a light tack acrylic laminating adhesive. These adhesive coated films were then hand laminated against inkjet printed graphics to determine the efficacy of the improvement of the durability of the images.

DRAWINGS

FIGS. 1 and 2 are plots of performance of ultraviolet absorbent materials; FIG. 1 shows ultraviolet light transmission of cast polyethylene terephthalate films taken from various Examples and Comparative Examples appearing in the specification, and FIG. 2 shows transmission percentages of laminated films, taken from other Examples and Comparative Examples.

FIG. 3 graphically shows light fade data of films of various Examples, with ultraviolet stabilizers as set forth in the Examples, and FIG. 4 is a plot of light fade data, as measured and as stated in the Examples identified.

Diagram 1 schematically shows a cross section of a prior art structure of a laminate and an overlamination film in accordance with aspects of the invention.

The drawings are intended to be illustrative but not to define or limit the scope of the invention, which is defined in the appended claims.

EXAMPLES

Example 1

Into 0.65 intrinsic viscosity (IV) pure PET resin, 20% by weight of 2,2'-methylene bis[6-(2H-benzotriazol-2-yl)-4-1,1,3,3-tetramethylbutyl) phenol] was mixed into a co-rotating twin screw extruder. 2,2'-methylenebis[6-(2H-benzotriazol-2-yl)-4-1,1,3,3-tetramethylbutyl)phenol] is manufactured by Ciba Specialty Chemicals, Tarrytown, N.Y. as Tinuvin 360. The extruded strands were cooled in a water trough, and then pelletized via cutting on a rotary cutting line. These pellets were then admixed with pure 0.65 IV PET chip and were extruded and cast into 6" sheets of 1 mil film. Film was prepared at 0.5%, 1%, and 3% by weight of UV stabilized PET sheet. There was no discoloration of the 1 mil cast film.

This film was characterized to have UV transmittance values of 39.6%, 13.2% and 6.4% at 0.5%, 1% and 3% UV stabilizer respectively.

Example 2

Into 0.65 intrinsic viscosity (IV) pure PET resin, 20% by weight of hydroxy phenyl benzotriazole dimer was mixed into a co-rotating twin screw extruder. Hydroxy phenyl benzotriazole dimer is manufactured by Fairmont Chemical Co., Newark, N.J. as Mixxim BB100. The extruded strands were cooled in a water trough, and then pelletized via cutting on a rotary cutting line. These pellets were then admixed with pure 0.65 IV PET chip and were extruded and cast into 6" sheets of 1 mil film. Film was prepared at 0.5%, 1% and 3% by weight of UV stabilized PET sheet. There was no discoloration of the 1 mil cast film.

This film was characterized to have UV transmittance values of 23.2%, 13.2% and 4.3% at 0.5%, 1% and 3% UV stabilizer respectively.

Example 3

Into 0.65 intrinsic viscosity (IV) pure PET resin, 20% by weight of 2,2'-(1,4-phenylene) bis[4H-3,1-benzoxazin-4-one] was mixed into a co-rotating twin screw extruder. 2,2'-(1,4-phenylene) bis[4H-3,1-benzoxazin-4-one] is manufactured by Cytec Industries, West Paterson, N.J. as Cyabsorb UV-3638. The extruded strands were cooled in a water trough, and then pelletized via cutting on a rotary cutting line. These pellets were then admixed with pure 0.65 IV PET chip and were extruded and cast into 6" sheets of 1 mil film. Film was prepared at 0.5%, 1% and 3% by weight of UV stabilized PET sheet. No discoloration of the 1 mil cast film was discernible.

This film was characterized to have UV transmittance values of 17.2%, 13.7% and 10.1% at 0.5%, 1% and 3% UV stabilizer respectively.

Example 4

Hindered Amine Light Stabilizer (HALS)

Into 0.65 intrinsic viscosity (IV) pure PET resin, 20% by weight of "Chimassorb 119 FL" 1,3,5-triazine-2,4,6-triamine,N,N''''-[1,2-ethane-diyl-bis[[[4,6-bis-[butyl(1,2,2,6,6-pentamethyl-4-piperidinyl)amino-1,3,5-triazine-2-yl]imino]-3,1-propanediyl]]bis[N'N'''-dibutyl-N',N'''-bis(1,2,2,6,6-pentamethyl-4-piperidinyl) was mixed into a co-rotating twin screw extruder. The extruded strands were cooled in a water trough and pelletized via cutting on a rotary cutting line. These pellets were then admixed with pure 0.65 IV PET chip and were extruded and cast into 6" sheets of 1 mil film. Film was prepared at 0.5%, 1% and 3% by weight of UV stabilized PET sheet. There was no discoloration of the 1 mil cast film was noted.

This film was characterized to have UV transmittance values of 67.0%, 59.0% and 45.4% at 0.5%, 1% and 3% UV stabilizer respectively.

"Chimassorb 119 FL" is a monomeric Hindered Amine Light Stabilizer (HALS) manufactured by Ciba Specialty Chemicals Corporation, Tarrytown, N.Y. It has a very high molecular weight of 2286. Because of the high molecular weight, it has a high melting range (115–150 C.), thus low migration compared to other HALS materials. "Chimassorb 119 FL" may be used in combination with different UVA materials.

Example 5

UVA with Optional HALS

By mixing the 20% master PET resins from Example (1) and Example (4) with pure 0.65 IV PET chip, 6" sheets of 1 mil film were extruded and cast. Film was prepared at 1% (1) and (4) by weight. No discoloration of the 1 mil cast film was discernable.

This film was characterized to have an UV transmittance of 7.8%.

Example 6

UVA with Optional HALS

By mixing the 20% master PET resins from Example (2) and Example (4) with pure 0.65 IV PET chip, 6" sheets of 1 mil film were extruded and cast. Film was prepared at 1% (2) and 1% (4) by weight. No discoloration of the 1 mil cast film was observed.

This film was characterized to have a UV transmittance of 6.2%.

Example 7

UVA with Optional HALS

By mixing the 20% master PET resins from Example (3) and Example (4) with pure 0.65 IV PET chip, 6" sheets of 1 mil film were extruded and cast. Film was prepared at 1% (3) and 1% (4) by weight. No discoloration of the 1 mil cast film took place.

This film was characterized to have a UV transmittance of 10.8%.

Example 8

A 1 mil commercially available UV blocking PET film, which contained ~1% by weight of 2,2'-(1,4-phenylene) bis[4H-3,1-benzoxazin-4-one] was coated with an acrylic pressure sensitive adhesive applied at 22 g/m$^2$ coating weight. A 142G PET was used for the release liner. This film was laminated to a test plot as described below for testing in the Atlas Weatherometer.

This film, together with the PSA layer, was characterized to have an UV transmittance of 12.9%.

Example 9

A 1 mil commercially available UV blocking PET film, which contained ~1% by weight of 2,2'-(1,4-phenylene) bis[4H-3,1-benzoxazin-4-one] was coated with an acrylic pressure sensitive adhesive at 22 g/m$^2$ coating weight. Additional UV stabilizers were incorporated into the PSA layer. A 142G PET was used for the release liner. This film was laminated to a test plot as described below for testing in the Atlas Weatherometer.

This film, together with the PSA layer, was characterized to have an UV transmittance of 11.3%.

Example 10

A 1 mil commercially available UV blocking PET film, which contained ~1% by weight of 2,2'-(1,4-phenylene) bis[4H-3,1-benzoxazin-4-one] was coated with acrylic pressure sensitive adhesive at 27 g/m$^2$ coating weight. A 142G PET was used for the release liner. This film was laminated to a test plot as described below for testing in the Atlas Weatherometer.

This film, together with the PSA layer, was characterized to have an UV transmittance of 13.9%.

Example 11

A 1 mil commercially available UV blocking PET film, which contained ~1% by weight of 2,2'-(1,4-phenylene)

bis[4H-3,1-benzoxazin-4-one] was coated with acrylic pressure sensitive adhesive at 27 g/m² coating weight. Additional UV stabilizers were incorporated into the PSA layer. A 142G PET was used for the release liner. This film was laminated to a test plot as described below for testing in the Atlas Weatherometer.

This film, together with the PSA layer, was characterized to have an UV transmittance of 11.4%.

Comparative Example 1

Into 0.65 intrinsic viscosity (IV) pure PET resin, 20% by weight of 2-[2-hydroxy-3,5-di-(1,1-dimethylbenzyl)phenyl]-2H-benzotriazole was mixed into a co-rotating twin screw extruder. 2-[2-hydroxy-3,5-di-(1,1-dimethylbenzyl)phenyl]-2H-benzotriazole is manufactured by Ciba Specialty Chemicals Corporation, Tarrytown, N.Y. as "Tinuvin 234". The extruded strands were cooled in a water trough and pelletized via cutting on a rotary cutting line. These pellets were then admixed with pure 0.65 IV PET chip and were extruded and cast into 6" sheets of 1 mil film. Film was prepared at 0.5% and 1% by weight of UV stabilized PET sheet. Slight discoloration of the 1 mil cast film was observed.

This film was characterized to have UV transmittance values of 31.9% and 20.3% at 0.5% and 1% UV stabilizer respectively.

Comparative Example 2

A 1 mil plain polyester film with no UV absorbent agent (Toray Lumirror T60 film) was overcoated with a light tack adhesive (National Starch 30–9172) using a #5 meyer rod and was dried in a forced convection oven at 125 C. for approximately 30 seconds. This film was laminated to a test plot as described below.

This film was characterized to have a UV transmittance of 72.4%.

Comparative Example 3

A thermal UV lamination film with UV absorbers in thermal adhesive layer from commercially available Transilwrap was thermally laminated to the EPSON 9000 test plot. The plot was mounted into the test panel used in the Atlas Weatherometer for further study of the light fastness of the inkjet media.

This film was characterized to have a UV transmittance of 16.4%.

Comparative Example 4

No lamination film was used and the inkjet test plot was mounted directly into the test panel used in the Atlas Weatherometer. Very rapid image degradation occurred on exposure to xenon light.

Comparative Example 5

Into 0.65 intrinsic viscosity (IV) pure PET resin, 20% by weight of 2-(2'-Hydroxy-5'-octylphenyl)-benzotriazole was mixed into a co-rotating twin screw extruder. 2-(2'-Hydroxy-5'-octylphenyl)-benzotriazole is manufactured by Cytec Industries, West Patterson, N.J. as UV-5411. The extruded strands were cooled in a water trough and pelletized via cutting on a rotary cutting line. These pellets were then admixed with pure 0.65 IV PET chip to be extruded and cast into 6" sheets of 1 mil film. However, no film was obtained due to too low melt viscosity.

Comparative Example 6

Into 0.65 intrinsic viscosity (IV) pure PET resin, 20% by weight of 2-(4,6-Diphenyl-1,3,5-triazin-2-yl)-5-((hexyl)oxyl-phenol was mixed into a co-rotating twin screw extruder. 2-(4,6-Diphenyl-1,3,5-triazin-2-yl)-5-((hexyl)oxyl-phenol is manufactured by Ciba Specialty Chemicals Corporation, Tarrytown, N.Y. The extrudate had a bright yellow coloration and smoked slightly at the die head. The extruded strands were cooled in a water trough and pelletized via cutting on a rotary cutting line. These pellets were then admixed with pure 0.65 IV PET chip to be extruded and cast into 6" sheets of 1 mil film. However, no film was obtained due to too low melt viscosity.

Comparative Example 7

A sample of commercially available UVA stabilized PET, Clear Weatherable 92 GA, prepared by dyeing the film was obtained. This film was found to have an UV cut-off of >15% and a yellowing value of >35%. Because of the large yellowing value, this film was not deemed satisfactory for overlamination use and was therefore, not tested further.

Description of Film Coating and Lamination

The film samples as described above in the examples were overcoated with a light tack acrylic adhesive (National Starch 30-9172) using a #5 Meyer rod and were dried in a forced convection oven at 125° C. for about 10 seconds. The adhesive coated sheets were then placed onto test image samples prepared with an Epson Stylus 9000® inkjet printer utilizing Epson dye based inkjet inks and laminated with hand pressure. The test images consisted of cyan (C), magenta (M), yellow (Y), red (100% yellow, 100% magenta), blue (100% cyan, 100% yellow), green (100% cyan, 100% magenta) and pure black (K) image areas. The image CIELAB D65 values of the laminated images were measured using a Xrite 962 colorimeter before exposure to UV light in the Atlas weatherometer. The laminated samples were then placed in an Atlas C35A weatherometer, maintained at about 35° C. chamber temperature and exposed to high pressure Xenon light at a pressure of 0.45 W/m² for a total time of up to 480 hours. The CIELAB D65 colorimetery values for the exposed samples were then measured and a total fading amount of five colors (RGCMY) after t hours was calculated according to the following equation:

$$\text{Total Fade After } t \text{ Hours} = \Sigma(RGCMY)\{(L_0-L_t)^2+(a_0-a_t)^2+(b_0-b_t)^2\}^{0.5} \quad \text{Equation 1}$$

Total fade data of inkjet images protected by PET film using different UV stabilizers after 144, 240 and 480 hours of exposure time to high pressure light in an Atlas weatherometer are listed in Table 1. Total light fade of PSA coated Examples 8, 9, 10 and 11 after 168, 240 and 360 hours are listed in Table 1 as well. The light fade trends are also plotted in FIGS. 3 and 4.

Although not wishing to be bound by any particular theories, we believe that the UV stabilizers, described here as low molecular weight organic moieties) when admixed into a relatively rigid PET matrix, the UV stabilizers are, therefore, surrounded by a constraining material. If the UV absorbers undergo covalent bond breakage via the conversion of light energy, the resultant free radical structures produced are locked into a relatively rigid cage. This then enhances the longevity of the UVAs by facilitating the recombination of the free radical pairs back into covalently bonded materials before facile bond re-arrangement can take place. Conversely, admixing UVAs into relatively low Tg adhesive layers does not surround the low molecular weight organic moieties with a rigid cage. This then allows for more rapid destruction of the UVAs themselves from free radical induced covalent bond scission. This degradation of such UVA in the adhesive systems results in poor performance in stabilizing the graphic images. For the same reason, degradation of other softer, low Tg films are believed to be faster compared to PET film.

For the purposes of this discussion the level of Total Fade as a function of time deemed acceptable is 40 units or less. As can be readily seen from the data in Table 1, the described invention results in laminated images with significantly longer lifetime under exposure to degratory UV light sources than prior art examples, all without resulting in yellowing of the background coloration.

Visible Absorbance is a measure of the overall color of the PET film. It is desirable to produce a UVA stabilized PET for overlamination graphics that is essentially color-free. Therefore, when overlaminated on a printed graphic, the color of the base film does not change the color of the graphic output. This information is captured by measuring the baseline on the UV/VIS spectrum of the UV stabilized PET greater that 400 nm and drawing the intersection of the absorption spectrum with 400 nm line. By dividing the transmission value at 400 nm with the transmission value at the visible baseline, a visible absorbance function could be derived. If this function is larger than about 35% the film was deemed too colored to be utilized for the overlamination of graphic output.

In addition to the requirements of UV transmittance and visible absorbance the thermal stability and compatibility of the UVA system with PET is a key variable. It is desired to have a very high melting point of the UVA to protect the organic materials from volatilizing at the time of melt extrusion of the PET blend. It is also desired that the UVA does not thermally degrade/oxide at high temperature so that no discoloration or harmful volatile gases are generated. This is very important since much of the PET needs to undergo multiple recycling. In addition, specific interactions of the UV with the PET or any additives in the PET, which degrade the PET, are also to be avoided. Furthermore, it is desired that the UVA be soluble in the PET at a level of at least 1% by weight in order to insure the greatest possible blocking efficiency. The solubility of the UVA in the PET was judged by visibly inspecting the clarity of the cast PET films.

When a UV absorber preferentially absorbs the UV light, it forms intermediate molecular structures with higher energy. They reversibly return to their original form by dissipating the energy as harmless heat (IR) through the polymer matrix. Therefore, UV absorbers can not only protect the plastic materials from degradation, but also prevent the harmful UV from reaching the items behind the plastics. However, because UV absorbers obey Beers law, which means the absorbance is proportional to the thickness and concentration, there will always be some UV light not absorbed that can then get into polymer matrix. This is especially true for the surface layer facing the light. As a result, quite often, radical scavenging Hindered Amine Light Stabilizer (HALS) are used together with UV absorbers to protect plastic materials. HALS works in a different way than UVA. When some UV light is not absorbed, free radicals that cause polymer degradation will be produced. HALS will react with these free radicals and prevent further degradation by these radicals. The HALS used should meet all the above requirements for UVA (high thermal stability, low volatility, low or no color and compatibility with the polymer). Additionally, it should not react with the polymer and the UVA.

As is readily apparent from the data shown here, our discovery produces an approximately 10× longevity in image stability of a non-overlaminated inkjet print and an approximate 3× longevity in image stability to an overlamination film prepared with an adhesive stabilized with an UVA and maintain a neutral color to the base PET film. This invention is, therefore, of significant commercial value.

TABLE I

| Sample | UV Stabilizer | Loading Amount | UV transmittance | Visible absorbance function | Fade 144 h | Fade 168 h | Fade 240 h | Fade 360 h | Fade 480 h |
| --- | --- | --- | --- | --- | --- | --- | --- | --- | --- |
| Example 1 | Tinuvin 360 | 0.5% | 39.6% | 1.1% | 43 | — | 78 | — | >100 |
| Example 1 | Tinuvin 360 | 1.0% | 13.2% | 9.2% | 18 | — | 28 | — | 57 |
| Example 1 | Tinuvin 360 | 3.0% | 6.4% | 18.5% | 15 | — | 21 | — | 37 |
| Example 2 | Mixxim BB100 | 0.5% | 23.2% | 4.0% | 27 | — | 47 | — | >100 |
| Example 2 | Mixxim BB100 | 1.0% | 12.7% | 9.3% | 21 | — | 34 | — | 73 |
| Example 2 | Mixxim BB100 | 3.0% | 4.3% | 29.1% | 16 | — | 22 | — | 39 |
| Example 3 | Cytec UV-3638 | 0.5% | 17.2% | 0 | 19 | — | 30 | — | 62 |
| Example 3 | Cytec UV-3638 | 1.0% | 13.7% | 0 | 17 | — | 26 | — | 53 |
| Example 3 | Cytec UV 3638 | 3.0% | 10.1% | 2.9% | 19 | — | 25 | — | 49 |
| Example 5 | Tinuvin 360 + Chimassorb 119 FL | 1%/1% | 7.8% | 14.5% | 29 | — | 36 | — | 59 |
| Example 6 | Mixxim BB100 + Chimassorb 119 FL | 1%/1% | 6.2% | 18.8% | 24 | — | 29 | — | 52 |
| Example 7 | Cytec UV 3638 + Chimassorb 119 FL | 1%/1% | 10.8% | 5.3% | 28 | — | 33 | — | 56 |
| Example 8 | Cytec UV-3638 | 1% | 12.9% | 1.9% | — | 33 | 33 | 48 | — |
| Example 9 | Cytec UV-3636 | 1% | 11.3% | 2.4% | — | 26 | 28 | 39 | — |
| Example 10 | Cytec UV-3638 | 1% | 13.9% | 0 | — | 30 | 31 | 44 | — |
| Example 11 | Cytec UV-3638 | 1% | 11.4% | 2.4% | — | 27 | 28 | 40 | — |
| Comparative Example 1 | Tinuvin 234 | 0.5% | 31.9% | 2.9% | 40 | — | 72 | — | >100 |

TABLE I-continued

| Sample | UV Stabilizer | Loading Amount | UV transmittance | Visible absorbance function | Fade 144 h | Fade 168 h | Fade 240 h | Fade 360 h | Fade 480 h |
|---|---|---|---|---|---|---|---|---|---|
| Comparative Example 1 | Tinuvin 234 | 1.0% | 20.3% | 5.2% | 25 | — | 45 | — | 90 |
| Comparative Example 2 | — | — | 72.4% | 0 | 63 | — | 88 | — | >100 |
| Comparative Example 3 | Thermal Lamination | | 16.4% | 5.0% | — | 56 | 73 | 98 | — |
| Comparative Example 4 | — | — | — | — | — | 121 | 141 | 158 | — |
| Comparative Example 5 | Cytec UV 5411 | — | — | — | — | — | — | — | — |
| Comparative Example 6 | Tinuvin 1577 FF | — | — | — | — | — | — | — | — |
| Comparative Example 7 | | | 4.3% | 47.2% | — | — | — | — | — |

Table 1; Composite light fading data summarizing all examples and comparative examples. Fade is in units of delta E according to equation 1.

We claim:

1. A UVA stabilized polyethylene terephthalate overlamination film having a maximum peak absorption of about 380 nm, an approximate UV transmittance of <14% and a Visible Absorbance value of less than about 20%, coated with an adhesive layer to facilitate anchorage of the polyethylene terephthalate film to a secondary print substrate.

2. The film defined in claim 1, wherein the a UVA stabilized polyethylene terephthalate film contains a hindered amine light stabilizer.

3. The film defined in claim 1, wherein the adhesive layer contains a UVA stabilizer to further improve image stability.

4. The film of claim 1, having a melting point of greater than about 270 C. and a thermal degradation temperature of greater than about 300 C. and a specific solubility in PET of at least about 1% by weight.

5. The film of claim 4, having a solubility in PET of at least 2% by weight.

6. The film of claim 4, having a solubility in PET of about 3% by weight.

7. A UVA stabilized overlamination film for the protection of graphic images comprising a UVA stabilized polyester film according to claim 1, wherein the adhesive layer is coated with a PSA layer to facilitate anchorage of the overlamination layer to the imaged media.

8. A UVA stabilized overlamination film for the protection of graphic images comprising a UVA stabilized polyester according to claim 1, wherein the adhesive layer is coated with a EVA thermally activated adhesive to facilitate anchorage of the overlamination layer to the imaged media.

9. A film according to claim 2 produced by inkjet printing, dielectric printing and thermal transfer printing.

10. A film according to claim 3 produced by inkjet printing, dielectric printing and thermal transfer printing.

11. A process of producing improved longevity overlaminated inkjet graphics comprising the step of introducing UVA stabilized PET having a UV transmittance value of less than about 14 and a visible absorbance value of less than about 20%.

* * * * *